(12) United States Patent
Park et al.

(10) Patent No.: US 10,535,315 B2
(45) Date of Patent: *Jan. 14, 2020

(54) DISPLAY DEVICE, METHOD FOR DRIVING DISPLAY DEVICE AND METHOD FOR MINIMIZING AFTERIMAGE OF DISPLAY DEVICE

(71) Applicant: Samsung Display Co., Ltd., Yongin-si (KR)

(72) Inventors: Joon-Hyung Park, Seoul (KR); Sun Young Kwon, Seoul (KR); Min-Hee Kim, Ansan-si (KR); Ji Hong Bae, Yongin-si (KR); Jong Ho Son, Seoul (KR); Keun Chan Oh, Cheonan-si (KR); Kyung Hee Lee, Suwon-si (KR); Kang Seob Jeong, Seongnam-si (KR); Kyung Seon Tak, Hwaseong-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 15 days.

This patent is subject to a terminal disclaimer.

(21) Appl. No.: 16/056,632

(22) Filed: Aug. 7, 2018

(65) Prior Publication Data

US 2018/0342219 A1    Nov. 29, 2018

Related U.S. Application Data

(63) Continuation of application No. 14/743,650, filed on Jun. 18, 2015, now Pat. No. 10,062,346.

(30) Foreign Application Priority Data

Dec. 31, 2014 (KR) .................. 10-2014-0195863

(51) Int. Cl.
  *G02F 1/1362* (2006.01)
  *G09G 3/00* (2006.01)
  (Continued)

(52) U.S. Cl.
  CPC ....... *G09G 3/3655* (2013.01); *G02F 1/13624* (2013.01); *G09G 3/006* (2013.01);
  (Continued)

(58) Field of Classification Search
  None
  See application file for complete search history.

(56) References Cited

U.S. PATENT DOCUMENTS 6,222,515 B1    4/2001   Yamaguchi et al.
7,731,865 B2    6/2010   Bernatz et al.
(Continued)

FOREIGN PATENT DOCUMENTS

CN    1527271    9/2004
CN    1959777    5/2007
(Continued)

OTHER PUBLICATIONS

Notice of Allowance, dated May 9, 2018, issued in U.S. Appl. No. 14/743,650.

*Primary Examiner* — Kent W Chang
*Assistant Examiner* — Benjamin Morales
(74) *Attorney, Agent, or Firm* — HC Park & Associates, PLC

(57) ABSTRACT

A display device including a liquid crystal panel assembly including a plurality of pixels, a data driver applying a data voltage to a plurality of data lines which is connected to the plurality of pixels, and a common voltage generator providing a common voltage to the liquid crystal panel assembly, in which the common voltage is an optimal common voltage for a maximum grayscale at which a flicker is minimized while a data voltage with a maximum grayscale is applied to the plurality of pixels.

10 Claims, 16 Drawing Sheets

(51) Int. Cl.
*G09G 3/36* (2006.01)
*G02F 1/1343* (2006.01)

(52) U.S. Cl.
CPC ............ *G02F 2001/134345* (2013.01); *G09G 2300/0447* (2013.01); *G09G 2300/0469* (2013.01); *G09G 2320/0257* (2013.01)

(56) References Cited

U.S. PATENT DOCUMENTS

| | | |
|---|---|---|
| 8,114,310 B2 | 2/2012 | Bernatz et al. |
| 8,299,995 B2 | 10/2012 | Jeong et al. |
| 8,968,842 B2 | 3/2015 | Bae et al. |
| 9,062,248 B2 | 6/2015 | Seong et al. |
| 2004/0239667 A1 | 12/2004 | Takahashi |
| 2007/0285367 A1 | 12/2007 | Guan et al. |
| 2007/0291190 A1 | 12/2007 | Shin et al. |
| 2008/0094334 A1 | 4/2008 | Baek et al. |
| 2008/0198124 A1 | 8/2008 | Kojima et al. |
| 2008/0297538 A1 | 12/2008 | Cho et al. |
| 2009/0146934 A1 | 6/2009 | Hong et al. |
| 2010/0033414 A1 | 2/2010 | Jeong et al. |
| 2012/0120124 A1 | 5/2012 | Zhang et al. |
| 2012/0236245 A1* | 9/2012 | Jung ................ G02F 1/134336 349/144 |
| 2013/0182018 A1 | 7/2013 | Jeong et al. |
| 2013/0249957 A1 | 9/2013 | Koide et al. |
| 2014/0204329 A1 | 7/2014 | Bae et al. |
| 2014/0368562 A1* | 12/2014 | Kim ..................... G09G 3/3614 345/694 |
| 2016/0171937 A1 | 6/2016 | Xu |

FOREIGN PATENT DOCUMENTS

| | | |
|---|---|---|
| CN | 101458905 | 6/2009 |
| CN | 102708821 | 10/2012 |
| CN | 103439814 | 12/2013 |
| EP | 0484159 | 5/1992 |
| KR | 10-2003-0073071 A | 9/2003 |
| KR | 10-2006-0071700 A | 6/2006 |
| KR | 10-2008-0105595 A | 12/2008 |
| KR | 10-2010-0018320 A | 2/2010 |
| KR | 10-2014-0014990 A | 2/2014 |
| KR | 10-2014-0095326 A | 8/2014 |

\* cited by examiner

DISPLAY DEVICE, METHOD FOR DRIVING DISPLAY DEVICE AND METHOD FOR MINIMIZING AFTERIMAGE OF DISPLAY DEVICE

CROSS REFERENCE TO RELATED APPLICATION

This application is a continuation of U.S. patent application Ser. No. 14/743,650, filed on Jun. 18, 2015, and claims priority to and the benefit of Korean Patent Application No. 10-2014-0195863 filed in the Korean Intellectual Property Office on Dec. 31, 2014, the entire contents of which are incorporated herein by reference.

BACKGROUND OF THE INVENTION

1. Field of Disclosure

Embodiments of the present invention relates to a display device, a driving method of a display device and a method of minimizing an afterimages of the display device.

2. Description of the Related Art

A liquid crystal display (LCD) which is one of the most common types of flat panel displays currently in use, includes two display panels with electrodes and a liquid crystal layer inserted therebetween. The liquid crystal display generates an electric field by applying a voltage to the electrodes to realign liquid crystal molecules of the liquid crystal layer and thus control transmittance of light so as to display images.

The liquid crystal display has an advantage of facilitating a reduction in thickness, but has a disadvantage that side visibility deteriorates as compared with front visibility, and as a result, in order to solve the disadvantage, various types of alignments of the liquid crystal and a driving method have been developed. As a method for implementing such a wide viewing angle, a liquid crystal display in which a pixel electrode and a common electrode are formed on one substrate has received attention.

Meanwhile, in the liquid crystal display, there is a characteristic that an optimal common voltage which is defined by an arithmetic mean value of a positive data voltage and a negative data voltage varies according to a grayscale. While an optimal common voltage varies according to a grayscale, an actual common voltage of the liquid crystal display does not vary according to a grayscale but is applied with a predetermined value. As a result, there are problems in that the liquid crystal layer is influenced by a residual DC voltage and an afterimage due to the residual DC voltage is generated.

The above information disclosed in this Related Art section is only for enhancement of understanding of the background of the invention and therefore it may contain information that does not form the prior art that is already known in this country to a person of ordinary skill in the art.

SUMMARY OF THE INVENTION

The present invention has been made in an effort to provide a display device capable of minimizing generation of an afterimage, a driving method of the display device, and a method of minimizing an afterimage of the display device.

An exemplary embodiment of the present invention provides a display device including: a liquid crystal panel assembly including a plurality of pixels; a data driver applying a data voltage to a plurality of data lines which is connected to the plurality of pixels; and a common voltage generator providing a common voltage to the liquid crystal panel assembly, in which the common voltage is an optimal common voltage for a maximum grayscale at which a flicker is minimized while a data voltage with a maximum grayscale is applied to the plurality of pixels, the data driver applies the data voltage with the minimum grayscale to the plurality of data lines so that a negative data voltage with a minimum grayscale is higher than the common voltage by a first voltage level or more, and each of the plurality of pixels includes a first subpixel and a second subpixel, and when the data voltage is applied to the pixel, a pixel voltage of the first subpixel and a pixel voltage of the second subpixel are different from each other.

The data driver may increase the data voltage with the minimum grayscale while a difference between the positive data voltage and the negative data voltage with the minimum grayscale is uniformly maintained.

The first voltage level may be a reference voltage at which ion impurities are suppressed from moving in a black pattern region where the data voltage with the minimum grayscale is applied.

The first voltage level may be 1 V.

The data driver may increase the data voltage with the minimum grayscale so that the negative data voltage with the minimum grayscale is higher than the common voltage by a second voltage level, and the second voltage level may be higher than the first voltage and be a maximum voltage at which a side contrast ratio for the minimum grayscale is not changed.

The positive data voltage with the minimum grayscale may be higher than the negative data voltage with the minimum grayscale, and the data driver may maximally set a difference between the negative data voltage with the minimum grayscale and the common voltage within a range where the side contrast ratio for the minimum grayscale is not changed.

The first subpixel may include a first switching element connected to the data line and a first liquid crystal capacitor connected to the first switching element.

The second subpixel may include a second switching element connected to the data line, a second liquid crystal capacitor connected to the second switching element, and a third switching element connected to the second liquid crystal capacitor and a divided reference voltage line.

Another exemplary embodiment of the present invention provides a driving method of a display device including a common electrode and a pixel electrode, the method including: applying a common voltage to the common electrode; and applying a data voltage to the pixel electrode, in which the common voltage is an optimal common voltage for a maximum grayscale at which a flicker is minimized while a data voltage with a maximum grayscale is applied to the plurality of pixels, and when the data voltage is a data voltage with a minimum grayscale, the data voltage with the minimum grayscale is increased and applied to be higher than the common voltage by a first voltage level or more.

The data voltage with the minimum grayscale may include a positive data voltage and a negative data voltage, and the data voltage with the minimum grayscale may be increased while a difference between the positive data voltage and the negative data voltage with the minimum grayscale is uniformly maintained.

The first voltage level may be a reference voltage at which ion impurities are suppressed from moving in a black pattern region where the data voltage with the minimum grayscale is applied.

The first voltage level may be 1 V.

The data voltage with the minimum grayscale may be increased so that the negative data voltage with the minimum grayscale is higher than the common voltage by a second voltage level, and the second voltage level may be higher than the first voltage level and be a maximum voltage at which a side contrast ratio for the minimum grayscale is not changed.

Each of the plurality of pixels may include a first subpixel and a second subpixel, and when the data voltage is applied to the pixel, a pixel voltage of the first subpixel and a pixel voltage of the second subpixel may be different from each other.

The first subpixel may include a first switching element connected to the data line and a first liquid crystal capacitor connected to the first switching element, and the first liquid crystal capacitor may be charged by a difference between the data voltage and the common voltage.

The second subpixel may include a second switching element connected to the data line, a second liquid crystal capacitor connected to the second switching element, and a third switching element connected to the second liquid crystal capacitor and a divided reference voltage line, and the second liquid crystal capacitor may be charged by decreasing the charging voltage of the difference between the data voltage and the common voltage by a difference between the charging voltage and the divided reference voltage of the divided voltage reference line.

Yet another exemplary embodiment of the present invention provides a method of minimizing an afterimage of a display device, the method including: applying a data voltage with a maximum grayscale to all of a plurality of pixels; applying any common voltage while the data voltage with the maximum grayscale is applied; measuring an optimal common voltage at which a flicker is minimized by controlling any common voltage; setting the optimal common voltage to an actual common voltage applied to the common electrode of the display device; and setting a data voltage with a minimum grayscale based on the actual common voltage, in which the data voltage with the minimum grayscale includes a positive data voltage and a negative data voltage, and the data voltage with the minimum grayscale is increased and set so that the negative data voltage with the minimum grayscale is higher than the common voltage by a first voltage level or more while a difference between the positive data voltage and the negative data voltage with the minimum grayscale is uniformly maintained.

The first voltage level may be a reference voltage at which ion impurities are suppressed from moving in a black pattern region where the data voltage with the minimum grayscale is applied.

The first voltage level may be 1 V.

The data voltage with the minimum grayscale may be increased so that the negative data voltage with the minimum grayscale is higher than the common voltage by a second voltage level, and the second voltage level may be higher than the first voltage level, and the data voltage with the minimum grayscale may be increased within a range where a side contrast ratio for the minimum grayscale is not changed.

Yet another exemplary embodiment of the present invention provides a display device including a liquid crystal panel assembly including a plurality of pixels, a data driver applying a data voltage to a plurality of data lines which is connected to the plurality of pixels, and a common voltage generator providing a common voltage to the liquid crystal panel assembly, in which the common voltage is an optimal common voltage for a maximum grayscale at which a flicker is minimized while a data voltage with a maximum grayscale is applied to the plurality of pixels.

The data driver may apply the data voltage with the minimum grayscale to the plurality of data lines so that a negative data voltage with a minimum grayscale is higher than the common voltage by a first voltage level or more.

The data driver may apply the data voltage with the minimum grayscale to the plurality of data lines so that a negative data voltage with a minimum grayscale is higher than the common voltage by a first voltage level or more.

The first voltage level may be a reference voltage at which ion impurities are suppressed from moving in a black pattern region where the data voltage with the minimum grayscale is applied.

The first voltage level may be 1 V.

The data driver may increase the data voltage with the minimum grayscale so that the negative data voltage with the minimum grayscale is higher than the common voltage by a second voltage level, and the second voltage level is higher than the first voltage and is a maximum voltage at which a side contrast ratio for the minimum grayscale is not changed.

The positive data voltage with the minimum grayscale may be higher than the negative data voltage with the minimum grayscale, and the data driver may maximally set a difference between the negative data voltage with the minimum grayscale and the common voltage within a range where the side contrast ratio for the minimum grayscale is not changed.

Each of the plurality of pixels may include a first subpixel and a second subpixel, and when the data voltage is applied to the pixel, a pixel voltage of the first subpixel and a pixel voltage of the second subpixel are different from each other.

The first subpixel may include a first switching element connected to the data line, and a first liquid crystal capacitor connected to the first switching element.

The second subpixel may include a second switching element connected to the data line, a second liquid crystal capacitor connected to the second switching element, and a third switching element connected to the second liquid crystal capacitor and a divided reference voltage line.

According to the exemplary embodiment of the present invention, it is possible to minimize generation of an afterimage in the liquid crystal display.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings, in which like reference symbols indicate the same or similar components, wherein.

DETAILED DESCRIPTION OF THE INVENTION

Figure 1:
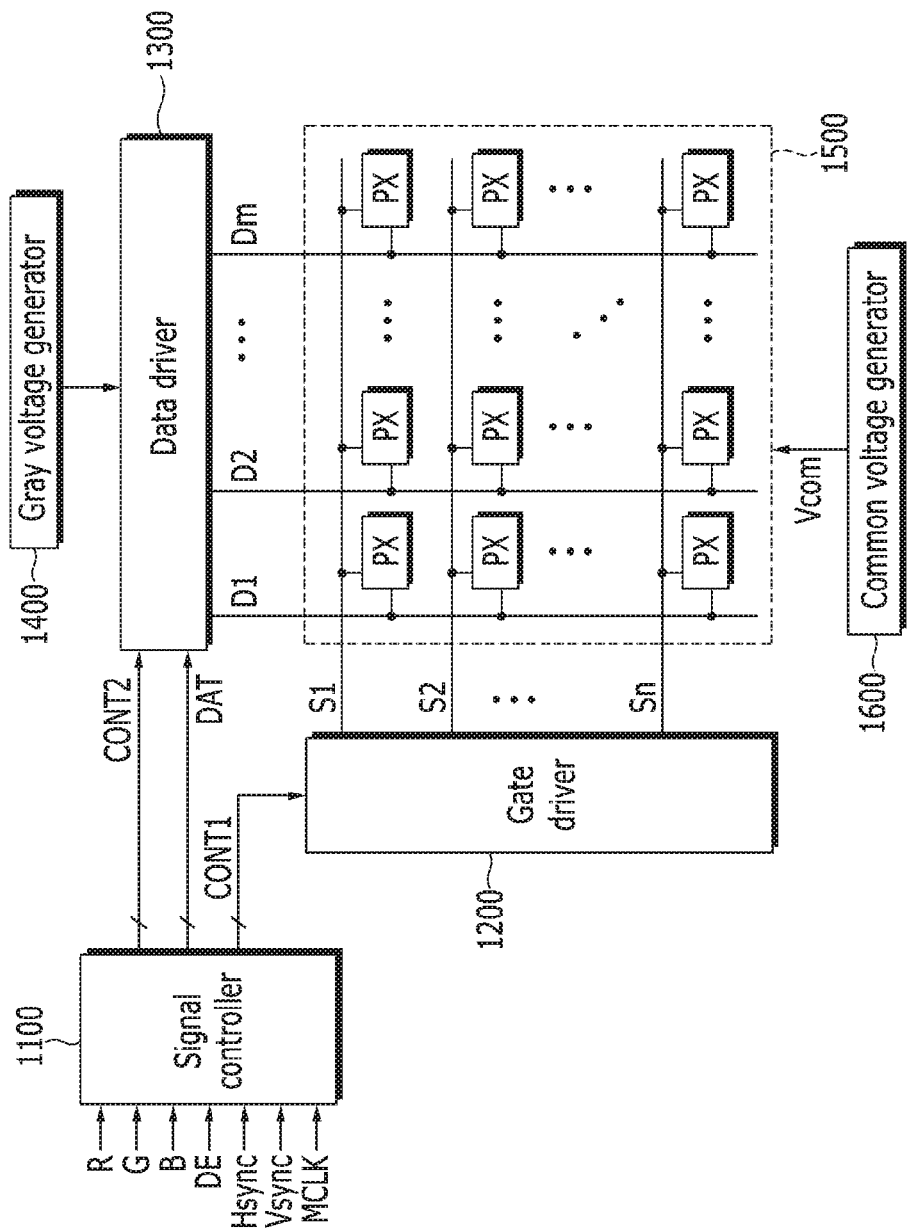
FIG. 1 is a block diagram of a display device according to an exemplary embodiment of the present invention.

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention.

Further, in exemplary embodiments, since like reference numerals designate like elements having the same configuration, a first exemplary embodiment is representatively described, and in other exemplary embodiments, only a configuration different from the first exemplary embodiment will be described.

Accordingly, the drawings and description are to be regarded as illustrative in nature and not restrictive. Like reference numerals designate like elements throughout the specification.

Throughout this specification and the claims that follow, when it is described that an element is "coupled" to another element, the element may be "directly coupled" to the other element or "electrically coupled" to the other element through a third element. In addition, unless explicitly described to the contrary, the word "comprise" and variations such as "comprises" or "comprising", will be understood to imply the inclusion of stated elements but not the exclusion of any other elements.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular example embodiments only and is not intended to be limiting of the invention. As used herein, the singular forms "a," "an" and "the" are intended to include the plural forms as well, unless the context clearly indicates otherwise.

In the drawings, the thickness of layers, films, panels, regions, etc., are exaggerated for clarity. Like reference numerals designate like elements throughout the specification. It will be understood that when an element such as a layer, film, region, or substrate is referred to as being "on" another element, it can be directly on the other element or intervening elements may also be present. In contrast, when an element is referred to as being "directly on" another element, there are no intervening elements present.

Hereinafter, a display device according to an exemplary embodiment of the present invention will be described in detail with reference to the accompanying drawings.

FIG. 1 is a block diagram of a display device according to an exemplary embodiment of the present invention.

Referring to FIG. 1, the display device includes a signal controller 1100, a gate driver 1200, a data driver 1300, a gray voltage generator 1400, a liquid crystal panel assembly 1500, and a common voltage generator 1600.

The liquid crystal panel assembly 1500 may include a plurality of gate lines S1-Sn, a plurality of data lines D1-Dm, and a plurality of pixels PX. The plurality of pixels PX is connected to the plurality of gate lines S1-Sn and the plurality of data lines D1-Dm to be arranged substantially in a matrix form. The plurality of gate lines S1-Sn may be extended substantially in a row direction to be substantially parallel to each other. The plurality of data lines D1-Dm may be extended substantially in a column direction to be substantially parallel to each other. Here, it is illustrated that only the plurality of gate lines S1-Sn and the plurality of data lines D1-Dm are connected to the plurality of pixels PX, but various signal lines such as a power line and a divided reference voltage line may be additionally connected to the plurality of pixels PX according to a structure of the pixel PX or a driving method.

Meanwhile, on a rear surface of the liquid crystal panel assemblyDeletedTexts1500, a back light (not illustrated) for controlling luminance of an image displayed on the liquid crystal panel assemblyDeletedTexts1500 may be provided. The back light emits light to the liquid crystal panel assembly 1500.

The signal controller 1100 receives image signals R, G, and B and an input control signal. The image signals R, G, and B store luminance information of the plurality of pixels. The luminance has a predetermined number, for example, 1024($=2^{10}$), 256($=2^8$) or 64($=2^6$) of grays. The input control signal includes a data enable signal DE, a horizontal synchronization signal Hsync, a vertical synchronization signal Vsync, and a main clock signal MCLK.

The signal controller 1100 generates a gate control signal CONT1, a data control signal CONT2, and an image data signal DAT according to the image signals R, G, and B, the data enable signal DE, the horizontal synchronization signal Hsync, the vertical synchronization signal Vsync, and the main clock signal MCLK. The signal controller 1100 generates an image data signal DAT by dividing the image signals R, G, and B by a frame unit according to the vertical synchronization signal Vsync and dividing the image signals R, G, and B by a gate line unit according to the horizontal synchronization signal Hsync.

The signal controller 1100 provides the image data signal DAT and the data control signal CONT2 to the data driver 1300. The data control signal CONT2 as a signal controlling an operation of the data driver 1300 includes a horizontal synchronization start signal STH notifying the transmission start of the image data signal DAT, a load signal LOAD instructing the output of the data signal to the data lines D1-Dm, and a data clock signal HCLK. The data control signal CONT2 may further include a reverse signal RVS for inverting a voltage polarity of the image data signal DAT for the common voltage Vcom.

The signal controller 1100 provides the gate control signal CONT1 to the gate driver 1200. The gate control signal CONT1 includes at least one clock signal controlling the output of the scanning start signal STV and the gate-on voltage from the gate driver 1200. The gate control signal CONT1 may further include an output enable signal OE that limits the duration of the gate-on voltage.

The gate driver 1200 applies a gate signal, which is configured in combination of a gate-on voltage and a gate-off voltage, which turns on and turns off switching elements Qa, Qb, and Qc (see FIG. 2) which are connected to the gate lines S1-Sn of the liquid crystal panel assembly 1500, to the plurality of gate lines S1-Sn.

The data driver 1300 may be connected to the plurality of data lines D1-Dm of the liquid crystal panel assembly 1500 and selects a gray voltage from the gray voltage generator 1400. The data driver 1300 applies the selected gray voltage to the data lines D1-Dm as the data voltage. The gray voltage generator 1400 may provide only a predetermined number of reference gray voltages without providing voltages for all grayscales. In this case, the data driver 1300 may divide the reference gray voltage to generate gray voltages for all of the grayscales and select the data voltages among the generated gray voltages.

A difference between the data voltage applied to the pixel PX and the common voltage Vcom is represented as a charging voltage of liquid crystal capacitors Clca and Clab (see FIG. 2), that is, a pixel voltage. The alignment of the liquid crystal molecules varies according to a magnitude of the pixel voltage, and as a result, the polarization of light passing through the liquid crystal layer 3 is changed. The change in the polarization is represented as a change in transmittance of the light by a polarizer, and as a result, the pixel PX displays luminance expressed by grayscales of the image signals R, G, and B.

The gate signals of the gate-on voltages are sequentially applied to the plurality of gate lines S1-Sn by setting 1 horizontal period as a unit and the data voltages are applied to the plurality of data lines D1-Dm corresponding to the gate signals of the gate-on voltages, and as a result, the data voltages are applied to all the pixels PX to display images in one frame. The 1 horizontal period is referred to as '1H' and the same as one period of the horizontal synchronization signal Hsync and the data enable signal DE.

When one frame ends, the next frame starts and a state of the reverse signal RVS applied to the data driver 1300 may be controlled so that the polarity of the data voltage applied to each pixel PX may be opposite to the polarity in the previous frame ("frame inversion"). In this case, even in one frame, according to a characteristic of the reverse signal RVS, a polarity of the data voltage applied to one data line may be periodically changed (row inversion and dot inversion), or polarities of data voltages applied to one pixel row may be different from each other (column inversion and dot inversion).

The data voltage may be divided into a positive data voltage and a negative data voltage according to a polarity. The positive data voltage for the same grayscale may be higher than the negative data voltage.

The common voltage generator 1600 provides a common voltage Vcom to the liquid crystal panel assembly 1500. In this case, the common voltage Vcom may be an optimal common voltage at which a flicker may be minimized while a data voltage of a maximum grayscale may be applied to the plurality of pixels PX. That is, the common voltage generator 1600 may provide the optimal common voltage for the maximum grayscale to the liquid crystal panel assembly 1500. The maximum grayscale means the highest grayscale among a predetermined number of grayscales of the display device, and for example, the maximum grayscale may be 64 grays, 256 grays, 1024 grays, or the like.

The data driver 1300 increases the data voltage with the minimum grayscale to apply the increased data voltage to the data lines D1-Dm. The data driver 1300 may increase a positive data voltage and a negative data voltage with a minimum grayscale while uniformly maintaining a difference between the positive data voltage and the negative data voltage with the minimum grayscale. The data driver 1300 may increase the data voltage with the minimum grayscale so that the negative data voltage with the minimum grayscale may be higher than the common voltage Vcom by a first voltage level or more. The first voltage level may be a reference voltage which suppresses movement of ion impurities in a black pattern region to which the data voltage with the minimum grayscale may be applied, and may be approximately 1 V (volt). In this case, the data driver 1300 may increase the data voltage with the minimum grayscale so that the negative data voltage with the minimum grayscale may be higher than the common voltage Vcom by a second voltage level. The second voltage level may be higher than the first voltage level and may be a maximum voltage at which a side contrast ratio for the minimum grayscale is not changed. The side contrast ratio means a contrast ratio which is measured at a side which forms a predetermined angle with a front of a screen of the display device. Accordingly, the fact that the side contrast ratio for the minimum grayscale is not changed means that brightness of a black pattern region measured at the front side and brightness of the black pattern region measured at the side are not changed. The data driver 1300 may maximally set a difference between the negative data voltage with the minimum grayscale and the common voltage Vcom in a range in which the side contrast ratio is not changed. Particularly, when the common voltage Vcom is defined as the optimal common voltage for the maximum grayscale, the positive data voltage and the negative data voltage with the minimum grayscale may be selected so that the difference between the negative data voltage with the minimum grayscale and the common voltage Vcom in a range in which the side contrast ratio is not changed may be the maximum. As such, the common voltage Vcom may be determined as the optimal common voltage for the maximum grayscale, and the ion impurities of the black pattern region are suppressed from moving to the white pattern region by increasing the data voltage with the minimum grayscale so as not to generate the afterimage. This will be described below.

Each of the signal controller 1100, the gate driver 1200, the data driver 1300, the gray voltage generator 1400, and the common voltage generator 1600 described above may be directly mounted on the liquid crystal panel assembly 1500 in at least one IC chip form, mounted on a flexible printed circuit film (not illustrated), attached to the liquid crystal panel assembly 1500 in a tape carrier package (TCP) form, or mounted on a separate printed circuit board (not illustrated). Alternatively, the signal controller 1100, the gate driver 1200, the data driver 1300, the gray voltage generator 1400, and the common voltage generator 1600 may be integrated on the liquid crystal panel assembly 1500 together with the signal lines S1-Sn and D1-Dm.

Figure 2:
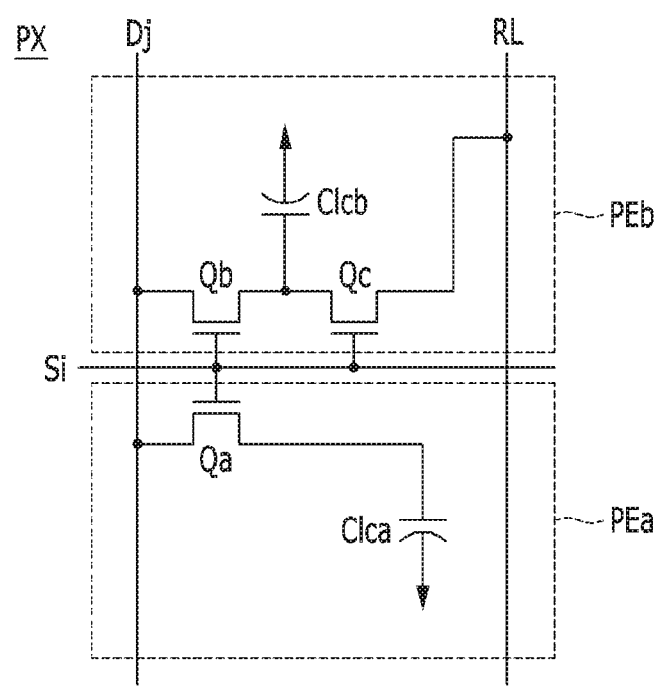
FIG. 2 is a circuit diagram illustrating one pixel in the display device according to the exemplary embodiment of the present invention.

FIG. 2 is a circuit diagram illustrating one pixel in the display device according to the exemplary embodiment of the present invention. A circuit structure of a pixel of the display device and a driving method thereof according to the exemplary embodiment of the present invention will be described with reference to FIG. 2.

One pixel PX included in the display device includes a first subpixel PEa and a second subpixel PEb. The first subpixel PEa includes a first switching element Qa and a first liquid crystal capacitor Clca. The second subpixel PEb includes a second switching element Qb, a third switching element Qc, and a second liquid crystal capacitor Clcb.

The first and second switching elements Qa and Qb are connected to a gate line Si and a data line Dj, respectively. The third switching element Qc may be connected to the gate line Si, an output terminal of the switching element Qb, and a divided reference voltage line RL. The first switching element Qa and the second switching element Qb are three-terminal elements such as thin film transistors, a control terminal may be connected to the gate line Si and the input terminal may be connected to the data line Dj. The output terminal of the first switching element Qa may be connected to the first liquid crystal capacitor Clca. An output terminal of the second switching element Qb may be connected to the second liquid crystal capacitor Clcb and an input terminal of the third switching element Qc. The third switching element Qc may be also a three-terminal element such as a thin film transistor, and a control terminal thereof may be connected to the gate line Si, an input terminal thereof may be connected to the second liquid crystal capacitor Clcb, and an output terminal thereof may be connected to the divided reference voltage line RL.

When a gate-on signal is applied to the gate line Si, the first switching element Qa, the second switching element Qb, and the third switching element Qc which are connected to the gate line Si are turned on. In this case, the data voltage may be applied to the data line Dj, and the data voltage applied to the data line Dj may be applied to the first subpixel electrode of the first subpixel PEa through the turned-on first switching element Qa and applied to the first subpixel electrode of the second subpixel PEb through the turned-on second switching element Qb. The data voltages applied to the first subpixel electrode and the second subpixel electrode are the same as each other, and thus the first liquid crystal capacitor Clca and the second liquid crystal capacitor Clcb are charged with the same value by a difference between the common voltage and the data voltage, but simultaneously, the voltage charged in the second liquid crystal capacitor Clcb is divided through the turned-on third switching element Qc. As a result, the voltage charged in the second liquid crystal capacitor Clcb may be decreased by a difference between the common voltage and the divided reference voltage.

A pixel voltage of the second subpixel PEb may be lower than a pixel voltage of the first subpixel PEa. The first subpixel PEa including the first subpixel electrode may be referred to as a high pixel and the second subpixel PEb including the second subpixel electrode may be referred to as a low pixel.

Since the voltage charged in the first liquid crystal capacitor Clca and the voltage charged in the second liquid crystal capacitor Clcb are different from each other, tilted angles of liquid crystal molecules in the first subpixel and the second subpixel are different from each other, and as a result, luminance of two subpixels varies. Accordingly, when the voltage of the first liquid crystal capacitor Clca and the voltage of the second liquid crystal capacitor Clcb are appropriately controlled, an image viewed from the side may be maximally approximated to an image viewed from the front, and this means improvement of side visibility.

Here, the circuit of the pixel as illustrated in FIG. 2 is described, but the pixel of the display device according to the exemplary embodiment of the present invention is not limited thereto but may be variously configured.

Next, a structure of the liquid crystal panel assembly 1500 of the display device according to the exemplary embodiment of the present invention will be described with reference to FIGS. 3 to 5.

Figure 3:
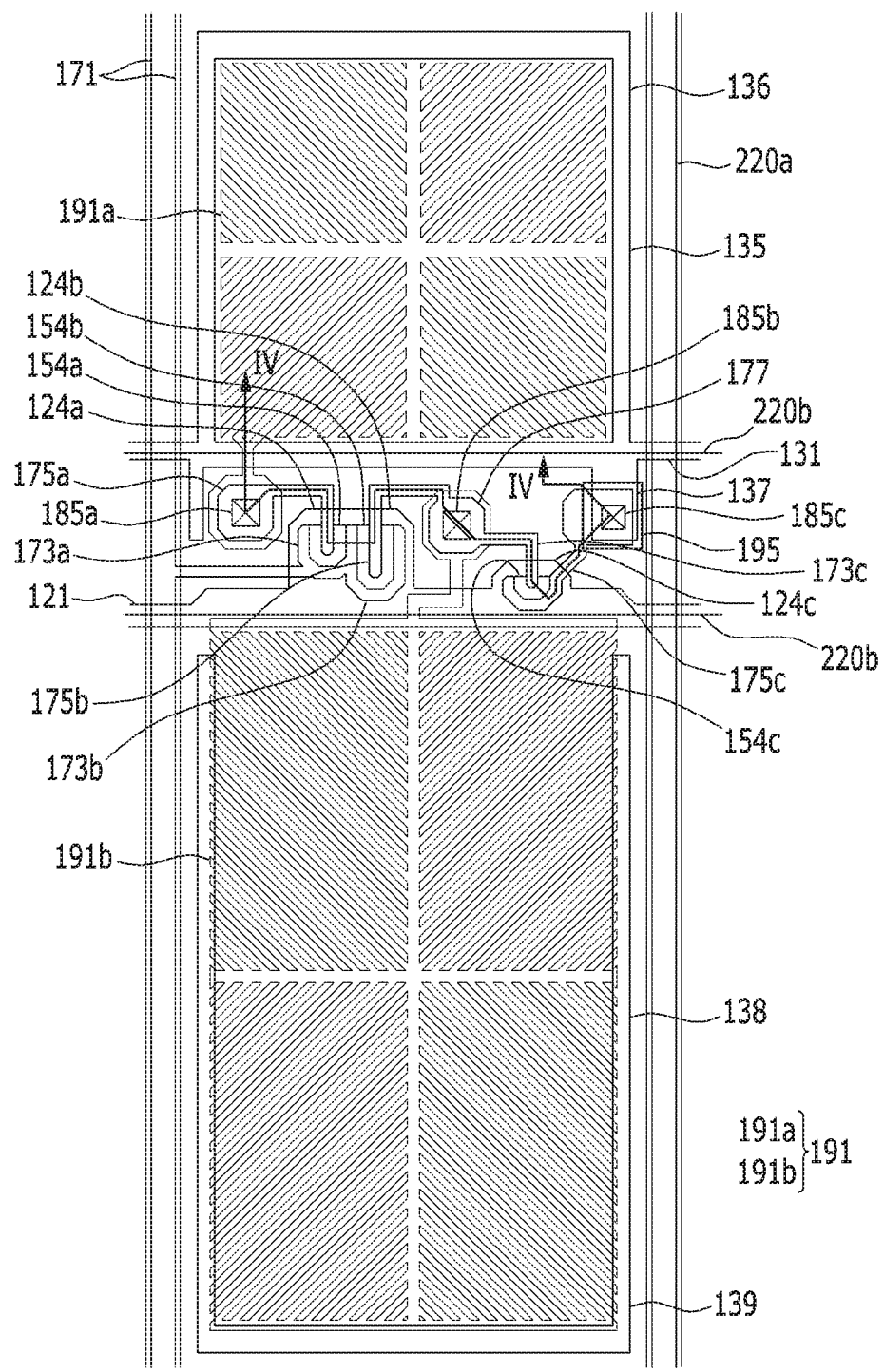
FIG. 3 is a plan view illustrating one pixel in the display device according to the exemplary embodiment of the present invention.

FIG. 3 is a plan view illustrating one pixel in the display device according to the exemplary embodiment of the present invention. FIG. 4 is a cross-sectional view of FIG. 3 taken along line IV-IV. FIG. 5 is a plan view illustrating a basic area of a pixel electrode in the display device according to the exemplary embodiment of the present invention.

Figure 4:
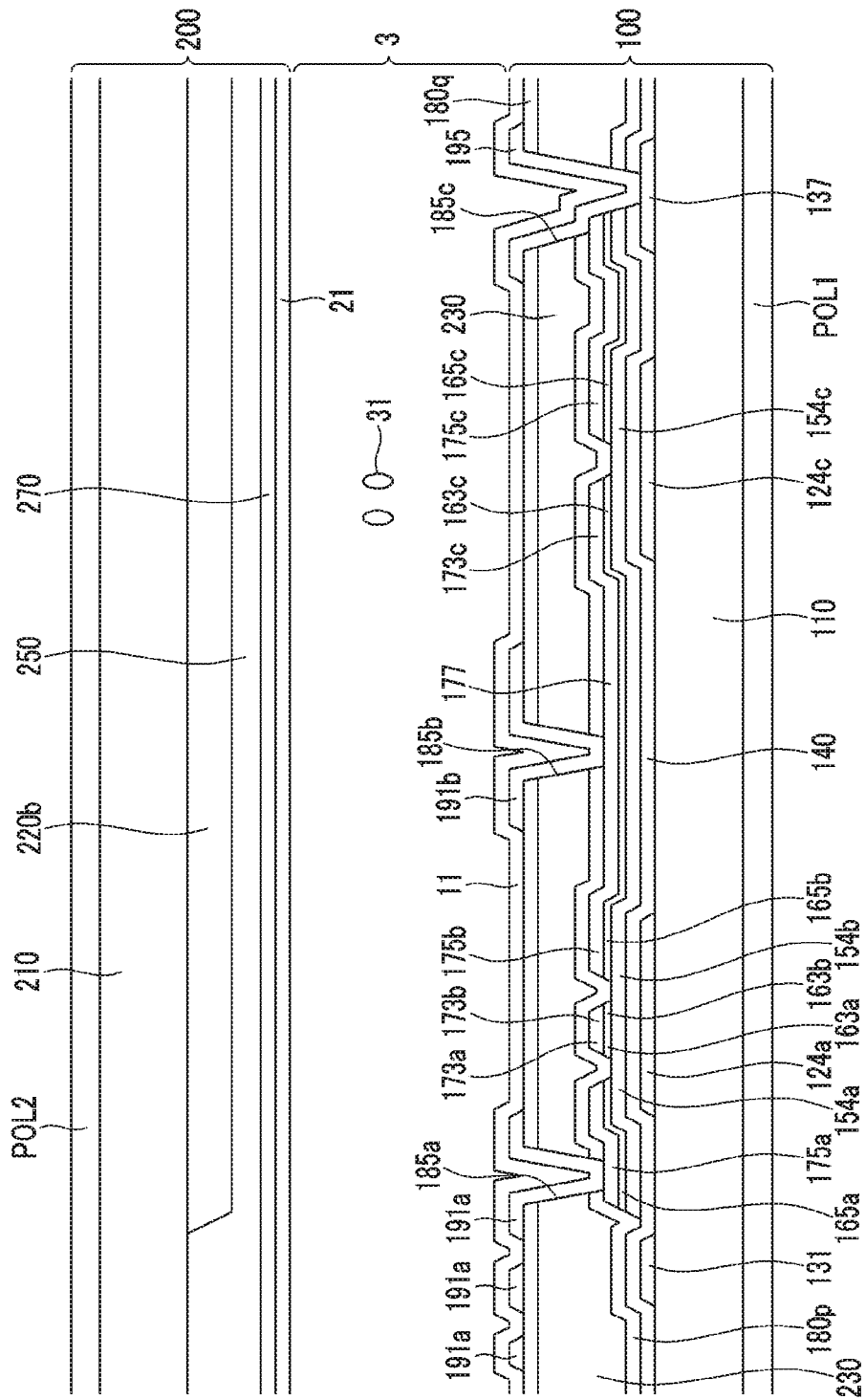
FIG. 4 is a cross-sectional view of FIG. 3 taken along line IV-IV.
Figure 5:
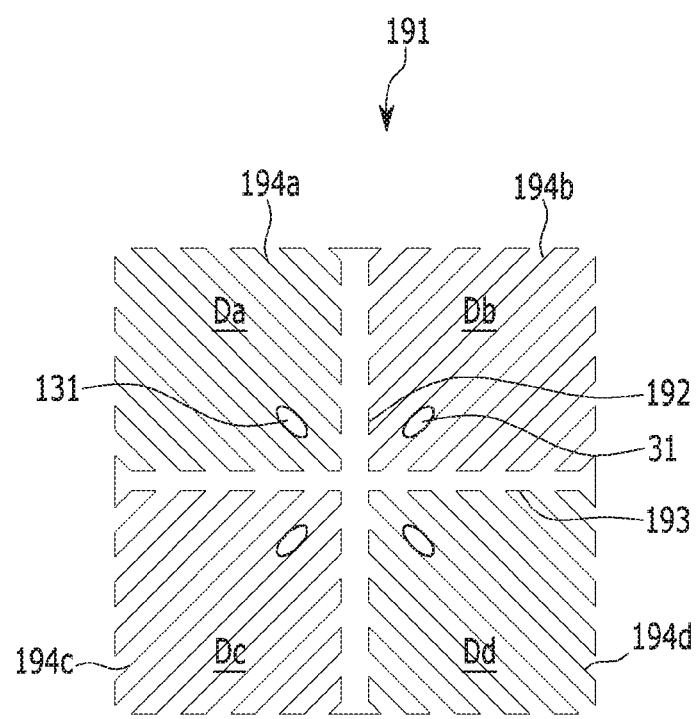
FIG. 5 is a plan view illustrating a basic area of a pixel electrode in the display device according to the exemplary embodiment of the present invention.

Referring to FIGS. 3 to 5, the display device includes a lower panel 100 and an upper panel 200 facing each other, and a liquid crystal layer 3 interposed between the two display panels 100 and 200 and including liquid crystal molecules 31. A pair of polarizers POL1 and POL2 may be attached on outer surfaces of the two display panels 100 and 200.

First, the lower panel 100 will be described.

A gate conductor including a gate line 121 and a divided reference voltage line 131 may be formed on a first insulation substrate 110. The gate line 121 includes a first gate electrode 124*a*, a second gate electrode 124*b*, a third gate electrode 124*c*, and a wide end portion (not illustrated) for connection with other layers or an external driving circuit. The divided reference voltage line 131 includes first storage electrodes 135 and 136, and a reference electrode 137. Second storage electrodes 138 and 139 which are not connected to the divided reference voltage line 131 but overlap with the second subpixel electrode 191*b* are positioned.

A gate insulating layer 140 may be positioned on the gate line 121 and the divided reference voltage line 131, and a first semiconductor layer 154*a*, a second semiconductor layer 154*b*, and a third semiconductor layer 154*c* are positioned on the gate insulating layer 140. A plurality of ohmic contacts 163*a*, 165*a*, 163*b*, 165*b*, 163*c*, and 165*c* may be positioned on the semiconductor layers 154*a*, 154*b*, and 154*c*.

A data conductor including a plurality of data lines 171 including a first source electrode 173*a* and a second source electrode 173*b*, a first drain electrode 175*a*, a second drain electrode 175*b*, a third source electrode 173*c*, a third drain electrode 175*c* may be positioned on the ohmic contacts 163a, 165a, 163b, 165b, 163c, and 165c and the gate insulating layer 140. The data conductor, the semiconductor positioned below the data conductor, and the ohmic contacts may be simultaneously formed by using one mask. The data line 171 includes a wide end portion (not illustrated) for connecting with other layers or an external driving circuit, and includes the semiconductor layers 154a, 154b, and 154c with the same plane form and the ohmic contacts 163a, 165a, 163b, 165b, 163c, and 165c.

The first gate electrode 124a, the first source electrode 173a, and the first drain electrode 175a form one first thin film transistor Qa together with the first semiconductor layer 154a. A channel of the first thin film transistor Qa may be formed in the first semiconductor layer 154a between the first source electrode 173a and the first drain electrode 175a.

Similarly, the second gate electrode 124b, the second source electrode 173b, and the second drain electrode 175b form one second thin film transistor Qb together with the second semiconductor layer 154b. A channel of the second thin film transistor Qb may be formed on the second semiconductor layer 154b between the second source electrode 173b and the second drain electrode 175b.

The third gate electrode 124c, the third source electrode 173c and the third drain electrode 175c form a third thin film transistor Qc together with the third semiconductor layer 154c. A channel of the third thin film transistor Qc may be formed on the third semiconductor layer 154c between the third source electrode 173c and the third drain electrode 175c. The second drain electrode 175b may be connected with the third source electrode 173c and includes an extension 177 which is widely extended.

On the data conductor 171, 173c, 175a, 175b, and 175c and the exposed portion of the semiconductor layers 154a, 154b, and 154c, a first passivation layer 180p is positioned. The first passivation layer 180p may be an inorganic insulating layer such as silicon nitride or silicon oxide. The first passivation layer 180p may prevent a pigment of the color filter 230 from flowing into the exposed portion of the semiconductor layers 154a, 154b, and 154c.

A vertical light blocking member 220a and a color filter 230 are positioned on the first passivation layer 180p. Any one of the vertical light blocking member 220a and the color filter 230 may be first positioned. The vertical light blocking member 220a may have a planar shape which is the same as or similar to that of the data line 171 and may be formed by cover the data line 171.

Here, the light blocking member 220a which is vertically extended is described, but is not limited thereto, but a shielding electrode which is simultaneously formed with the pixel electrode and receives the common voltage may also be applied.

The color filter 230 extends in a vertical direction along two adjacent data lines. Two color filters 230 which are adjacent to each other may be separated from each other based on the data line 171 or overlap with each other in an adjacent region of the data line 171.

The color filter 230 may uniquely display one of the primary colors, and an example of the primary colors may include three primary colors of red, green, and blue or yellow, cyan, magenta, and the like. Although not illustrated, the color filter 230 may further include a color filter which displays a mixed color of the primary colors or white in addition to the primary colors.

A second passivation layer 180q may be positioned on the vertical light blocking member 220a and the color filter 230. The second passivation layer 180q may be an inorganic insulating layer such as silicon nitride or silicon oxide. The second passivation layer 180q may prevent the color filter 230 from being lifted and suppress the contamination of the liquid crystal layer 3 due to an organic material such as a solvent flowing into from the color filter 230, thereby preventing a defect such as an afterimage which may be caused when a screen is driven.

In the first passivation layer 180p, the color filter 230, and the second passivation layer 180q, a first contact hole 185a exposing the first drain electrode 175a and a second contact hole 185b exposing the second drain electrode 175b are formed. In the first passivation layer 180p, the second passivation layer 180q, and the gate insulating layer 140, a third contact hole 185c which exposes a part of a reference electrode 137 and a part of the third drain electrode 175c is formed. The third contact hole 185c may be covered by a connecting member 195. The connecting member 195 electrically connects the reference electrode 137 and the third drain electrode 175c exposed by the third contact hole 185c.

A plurality of pixel electrodes 191 may be positioned on the second passivation layer 180q. Each pixel electrode 191 includes a first subpixel electrode 191a and a second subpixel electrode 191b which are separated from each other with the gate line 121 therebetween and adjacent to each other in a column direction based on the gate line 121. The pixel electrode 191 may be made of a transparent conductive material such as ITO or IZO, or may also be made of a reflective metal such as aluminum, silver, chromium, or an alloy thereof.

Each of the first subpixel electrode 191a and the second subpixel electrode 191b includes a basic region of the pixel electrode 191 illustrated in FIG. 5 or one or more modifications thereof. The first subpixel electrode 191a may be physically and electrically connected with the first drain electrode 175a through the first contact hole 185a and receives the data voltage from the first drain electrode 175a. The second subpixel electrode 191b may be physically and electrically connected with the second drain electrode 175b through the second contact hole 185b and receives the data voltage from the second drain electrode 175b. A part of the data voltage applied to the second drain electrode 175b may be divided through the third source electrode 173c, and as a result, a magnitude of the voltage applied to the first subpixel electrode 191a may be larger than that of the voltage applied to the second subpixel electrode 191b.

The first subpixel electrode 191a and the second subpixel electrode 191b to which the data voltages are applied generate an electric field together with a common electrode 270 of the upper panel 200 which is be described below to determine directions of the liquid crystal molecules of the liquid crystal layer 3 between the two electrodes 191 and 270. Luminance of light passing through the liquid crystal layer 3 varies according to the determined directions of the liquid crystal molecules.

A lower alignment layer 11 may be formed on the pixel electrode 191.

Next, the upper panel 200 will be described.

A horizontal light blocking member 220b may be formed on a second insulation substrate 210. The horizontal light blocking member 220b is called a black matrix and blocks light leakage. The horizontal light blocking member 220b may be positioned in a region corresponding to the gate line 121. That is, the horizontal light blocking member 220b which is extended in a row direction may be provided.

The second polarizer POL2 may be disposed below the second insulation substrate 210, that is, on an opposite side of the horizontal light blocking member 220b.

An overcoat 250 may be formed on the light blocking member. The overcoat 250 may be made of an organic insulating material and provides a flat surface. According to an exemplary embodiment, the overcoat 250 may be omitted.

The common electrode 270 may be formed on the overcoat 250. The common electrode 270 may be formed of a transparent conductor such as ITO and IZO.

An upper alignment layer 21 may be formed on the common electrode 270.

The liquid crystal layer 3 includes a plurality of liquid crystal molecules 31, and the liquid crystal molecules 31 are aligned to be vertical to the surfaces of the two substrates 110 and 210 while the voltages are not applied to the two field generating electrodes 191 and 270. The liquid crystal molecules 31 may be aligned to have pretilts which are tilted in the same direction as a length direction of a cutout pattern of the pixel electrode 191.

As illustrated in FIG. 5, an overall shape of the pixel electrode 191 may be a quadrangle and includes a cross stem configured by a horizontal stem 193 and a vertical stem 192 perpendicular to the horizontal stem 193. The pixel electrode 191 may be divided into a first subregion Da, a second subregion Db, a third subregion Dc, and a fourth subregion Dd by the horizontal stem 193 and the vertical stem 192. The subregions Da, Db, Dc, and Dd include a plurality of first minute branches 194a, a plurality of second minute branches 194b, a plurality of third minute branches 194c, and a plurality of fourth minute branches 194d, respectively.

The first minute branches 194a extend obliquely in an upper left direction from the horizontal stem 193 or the vertical stem 192, and the second minute branches 194b extend obliquely in an upper right direction from the horizontal stem 193 or the vertical stem 192. The third minute branches 194c extend obliquely in a lower left direction from the horizontal stem 193 or the vertical stem 192, and the fourth minute branches 194d extend obliquely in a lower right direction from the horizontal stem 193 or the vertical stem 192.

The first to fourth minute branches 194a, 194b, 194c, and 194d form an angle of approximately 45° or 135° with the gate lines 121a and 121b or the horizontal stem 193. Further, the minute branches 194a, 194b, 194c, and 194d of two adjacent subregions Da, Db, Dc, and Dd may be perpendicular to each other.

Widths of the minute branches 194a, 194b, 194c, and 194d may be 2.5 μm to 5.0 μm, and a distance between the adjacent minute branches 194a, 194b, 194c, and 194d in one of the subregions Da, Db, Dc, and Dd may be 2.5 μm to 5.0 μm.

According to another exemplary embodiment of the present invention, widths of the minute branches 194a, 194b, 194c, and 194d may be increased toward the horizontal stem 193 or the vertical stem 192, and a difference between a portion with the largest width and a portion having the smallest width of one of the minute branches 194a, 194b, 194c, and 194d may be 0.2 μm to 1.5 μm.

Hereinafter, a method of measuring an afterimage of the display device and a type of afterimage will be described with reference to FIGS. 6 to 12.

Figure 6:
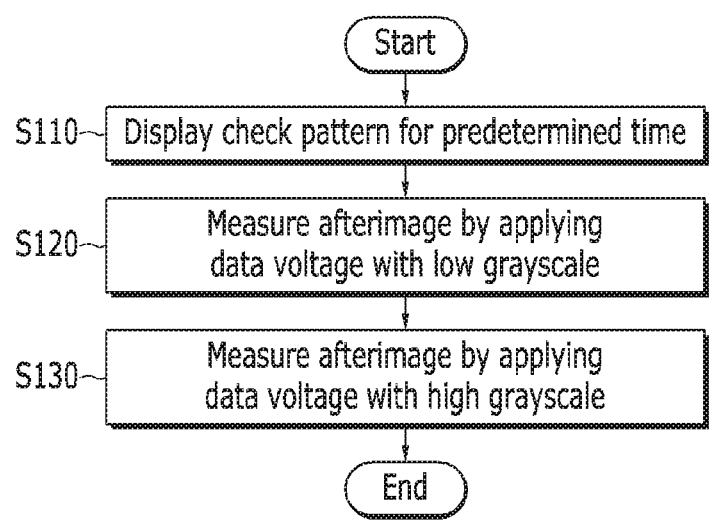
FIG. 6 is a flowchart illustrating a method of measuring an afterimage of the display device.
Figure 7:
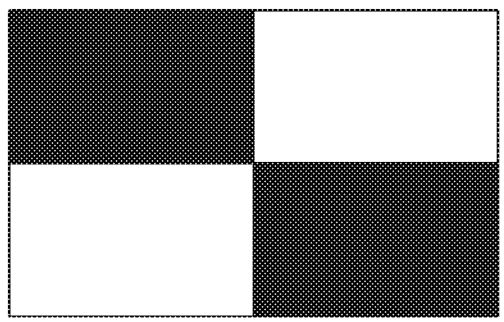
FIG. 7 illustrates an example of a check pattern for measuring the afterimage of the display device.
Figure 8:
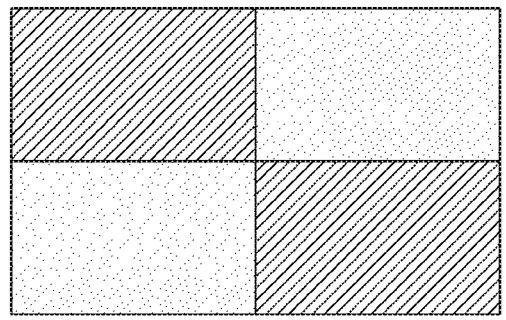
FIG. 8 illustrates an example of a planar afterimage shown when displaying a low-grayscale image after applying a check pattern for a predetermined time.
Figure 9:
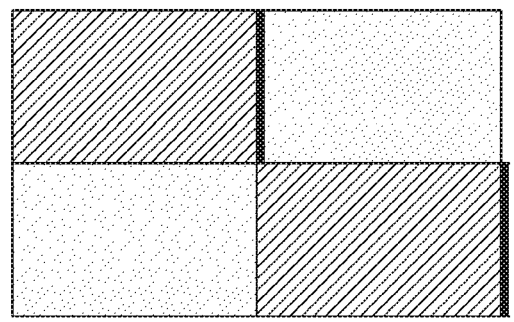
FIG. 9 illustrates an example of a linear afterimage shown when displaying a low-grayscale image after applying a check pattern for a predetermined time.
Figure 10:
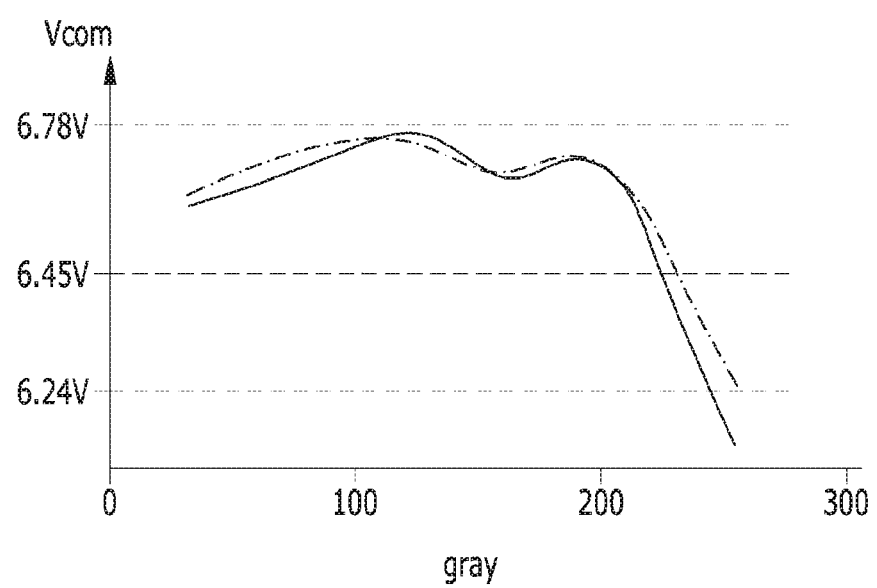
FIG. 10 is a graph illustrating an example of an optimal common voltage for each grayscale.
Figure 11:
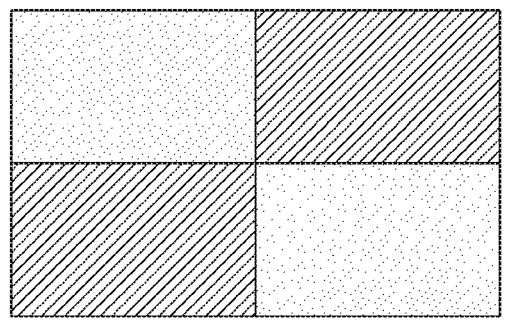
FIG. 11 illustrates an example of a reverse afterimage shown when displaying a high-grayscale image after applying a check pattern for a predetermined time.
Figure 12:
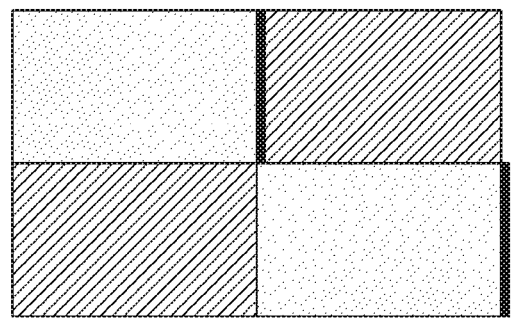
FIG. 12 illustrates an example of a reverse linear afterimage shown when displaying a high-grayscale image after applying a check pattern for a predetermined time.

FIG. 6 is a flowchart illustrating a method of measuring an afterimage of the display device. FIG. 7 illustrates an example of a check pattern for measuring the afterimage of the display device. FIG. 8 illustrates an example of a planar afterimage shown when displaying a low-grayscale image after applying a check pattern for a predetermined time. FIG. 9 illustrates an example of a linear afterimage shown when displaying a low-grayscale image after applying a check pattern for a predetermined time. FIG. 10 is a graph illustrating an example of an optimal common voltage for each grayscale. FIG. 11 illustrates an example of a reverse afterimage shown when displaying a high-grayscale image after applying a check pattern for a predetermined time. FIG. 12 illustrates an example of a reverse linear afterimage shown when displaying a high-grayscale image after applying a check pattern for a predetermined time.

Referring to FIGS. 6 to 12, a check pattern is displayed on the display device for a predetermined time (S110). As illustrated in FIG. 7, the check pattern includes a black pattern region and a white pattern region. For a predetermined time, the data voltage with the minimum grayscale is applied to the pixel in the black pattern region, and the data voltage with the maximum grayscale may be applied to the pixel in the white pattern region. For example, the display device may display the check pattern for approximately 1 hour.

After the check pattern may be displayed on the display device for the predetermined time, the afterimage may be measured by applying the data voltage with the low grayscale to all of the plurality of pixels (S120). That is, the low-grayscale image may be displayed on the display device and at the time, the generated afterimage may be measured.

For example, when the maximum grayscale of the display device is 64 grays, the data voltage with approximately 8 grays may be applied to all of the plurality of pixels. When the maximum grayscale of the display device is 256 grays, the data voltage with approximately 32 grays may be applied to all of the plurality of pixels. The data voltage with the low grayscale is applied to all the plurality of pixels and thus the low-grayscale image may be displayed on the display device. When the low-grayscale image is displayed after the check pattern is displayed on the display device for the predetermined time, as illustrated in FIG. 8, a planar afterimage is generated or as illustrated in FIG. 9, a linear afterimage may be generated.

As illustrated in FIG. 10, the optimal common voltage varies according to a grayscale. In this case, it is assumed that an actual common voltage may be set to an optimal common voltage for a halftone grayscale. For example, when the maximum grayscale is 256 grays, the actual common voltage of the display device may be set to an optimal common voltage for 128 grays. For example, the actual common voltage may be set as 6.78 V which is the optimal common voltage for 128 grays. In this case, the optimal common voltage for the maximum grayscale may be 6.24 V.

The ion impurities existing in the liquid crystal layer may be absorbed onto the lower alignment layer 11 and the upper alignment layer 21 by a difference between the optimal common voltages while the check pattern is displayed. A residual DC voltage may be formed by the absorbed ion impurities. Such a residual DC voltage has an effect to increase the pixel voltage. When the check pattern may be displayed, relatively more ion impurities are absorbed onto the white pattern region than the black pattern region. As a result, when the low-grayscale image may be displayed, the white pattern region is more brightly shown, and as illustrated in FIG. 8, a planar afterimage may be generated so that a portion which was the black pattern region is more darkly shown than a portion which was the white pattern region.

Further, the ion impurities move in the liquid crystal layer while the check pattern may be displayed, and thus more ion impurities may be absorbed onto a boundary between the black pattern region and the white pattern region. As a result, as illustrated in FIG. 9, a linear afterimage in which a darker line is shown on the boundary between the black pattern region and the white pattern region may be generated. The linear afterimage may be generated in addition to the planar afterimage.

Next, the afterimage may be measured by applying a data voltage with a high grayscale to all of the plurality of pixels (S120). That is, a high-grayscale image may be displayed on the display device, and at the time, the generated afterimage may be measured. When the data voltage with the high grayscale may be applied to all of the plurality of pixels, the planar afterimage and the linear afterimage may disappear by reducing an afterimage level.

On the other hand, in the case where the trend of the residual DC voltage may be strongly formed, when the data voltage with the high grayscale may be applied, as illustrated in FIG. 11, a reverse afterimage may be generated. The reverse afterimage may be an afterimage in which luminance of the white pattern region and the black pattern region is inverted. That is, the reverse afterimage is an afterimage in which the portion which was the white pattern region is more darkly shown than the portion which was the black pattern region. The reverse afterimage as a type of planar afterimage may be generated in the case where the ion impurities are strongly absorbed onto the white pattern region.

Further, while the check pattern may be displayed, the ion impurities move in the liquid crystal layer and thus more ion impurities are absorbed onto the boundary between the black pattern region and the white pattern region. As a result, when the data voltage with the high grayscale may be applied, as illustrated in FIG. 12, a reverse linear afterimage in which the linear afterimage in addition to the reverse afterimage is shown may be generated. The reverse afterimage and the reverse linear afterimage may be generated due to degradation of the thin film transistor at a high temperature.

Hereinafter, a mechanism by which the reverse linear afterimage may be generated will be described with reference to FIG. 13.

Figure 13:
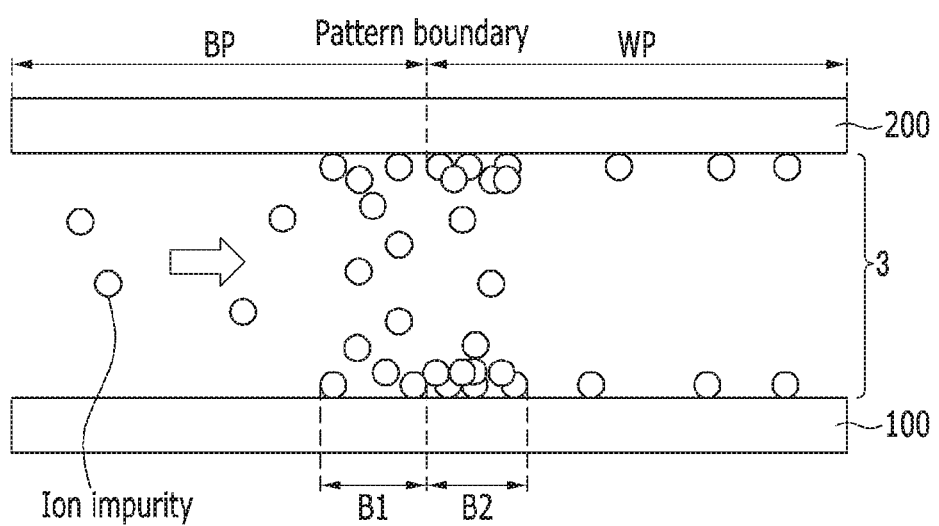
FIG. 13 is an exemplary diagram for describing a mechanism by which the reverse linear afterimage is generated.

FIG. 13 is an exemplary diagram for describing a mechanism by which the reverse linear afterimage is generated.

Referring to FIG. 13, it is assumed that an optimal common voltage for a halftone grayscale may be applied to the common electrode of the upper panel 200. In this case, a data voltage with a minimum grayscale may be applied to a pixel electrode in a black pattern region BP, and a data voltage with a maximum grayscale may be applied to a pixel electrode in a white pattern region WP. That is, this is a state where the check pattern may be displayed on the display device.

As exemplified in FIG. 10, a difference between the optimal common voltage for the halftone grayscale and the optimal common voltage for the maximum grayscale is relatively largest. This means that symmetry of the positive data voltage and the negative data voltage with the maximum grayscale is worst based on the optimal common voltage for the halftone grayscale which may be applied to the common electrode. In the white pattern region WP where the symmetry of the positive data voltage and the negative data voltage is worst, the ion impurities may be strongly absorbed. That is, the ion impurities existing in the white pattern region WP are absorbed onto the lower alignment layer 11 and the upper alignment layer 21.

On the other hand, the symmetry of the positive data voltage and the negative data voltage with the minimum grayscale is relatively excellent. In the black pattern region BP where the symmetry of the positive data voltage and the negative data voltage is relatively excellent, the ion impurities are not strongly absorbed.

The ion impurities existing in the black pattern region BP move toward the white pattern region WP where the data voltage with the maximum grayscale may be applied to form a strong electric field. That is, the ion impurities in the black pattern region BP move to a pattern boundary and are concentrated around the pattern boundary. Suspended ion impurities are increased in a region B1 which may be adjacent to the pattern boundary in the black pattern region BP side. On the other hand, since the strong electric field may be formed in the white pattern region WP, the absorbed ion impurities are increased in a region B2 which may be adjacent to the pattern boundary in the white pattern region WP side.

As a result, more ion impurities which are absorbed onto the white pattern region WP than the black pattern region BP exist, and many ion impurities absorbed onto the region B2 which may be adjacent to the pattern boundary in the white pattern region WP side exist. Accordingly, the reverse linear afterimage may be generated as illustrated in FIG. 12. The reverse linear afterimage is a very bad afterimage in which does not disappear even though the data voltage with the high grayscale may be applied.

In one pixel PX including the first subpixel PEa and the second subpixel PEb according to the exemplary embodiment of the present invention, many ion impurities are absorbed into a narrow region of the second subpixel PEb of the white pattern region WP which may be adjacent to the pattern boundary to generate the reverse linear afterimage.

Figure 14:
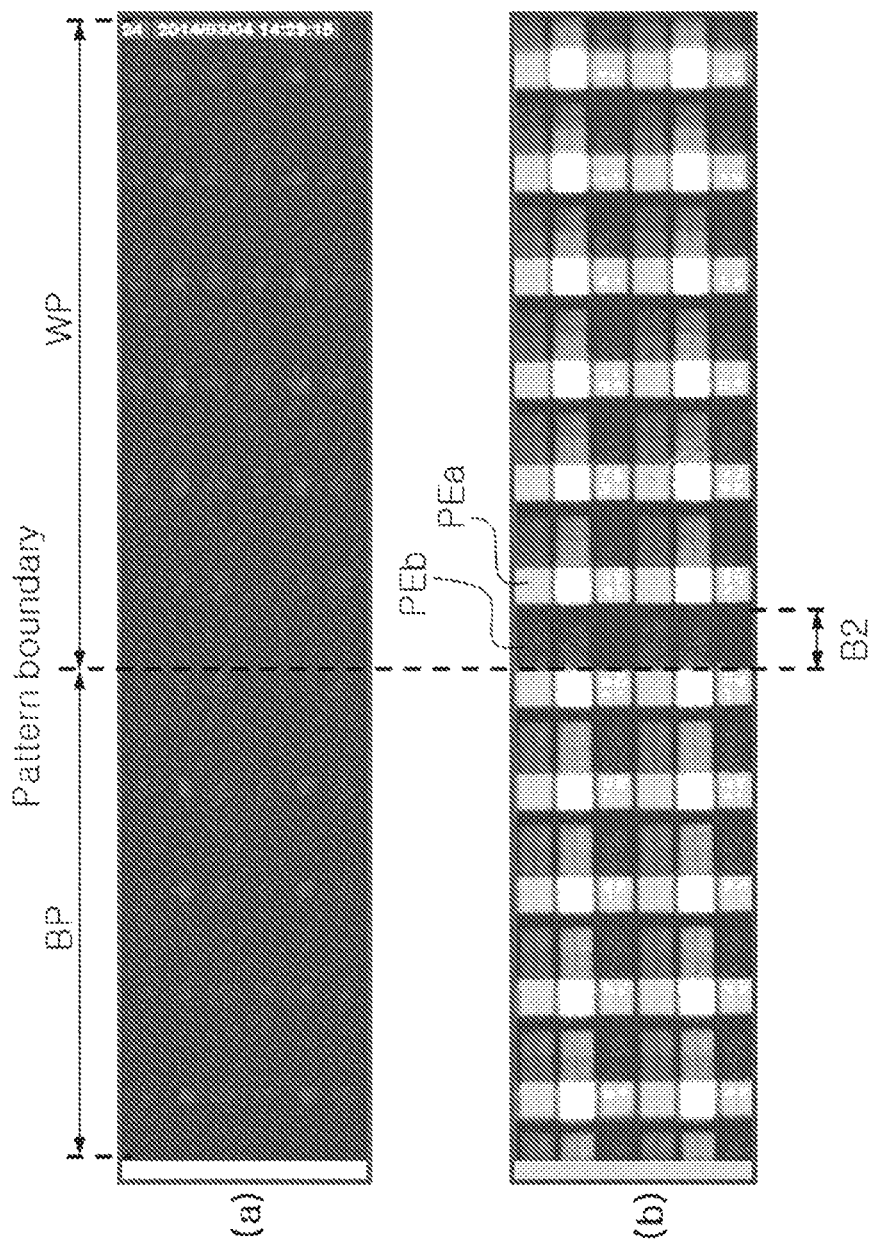
FIG. 14 is an exemplary diagram illustrating an actual reverse linear afterimage.

FIG. 14 is an exemplary diagram illustrating an actual reverse linear afterimage.

Referring to FIG. 14, FIG. 14A illustrates a case where the data voltage with the low grayscale may be applied to all of the plurality of pixels after the check pattern is displayed for a predetermined time, and FIG. 14B illustrates a case where the data voltage with the high grayscale may be applied to all of the plurality of pixels. In FIG. 14B, it may be shown that luminance of the second subpixel PEb of the white pattern region WP which may be adjacent to the pattern boundary is degraded. The reason is that as illustrated in FIG. 13, the ion impurities existing in the black pattern region BP move to be absorbed into the region of the second subpixel PEb of the white pattern region WP which is adjacent to the pattern boundary.

Hereinafter, a method of minimizing generation of the afterimage in the display device will be described with reference to FIGS. 15 and 16.

Figure 15:
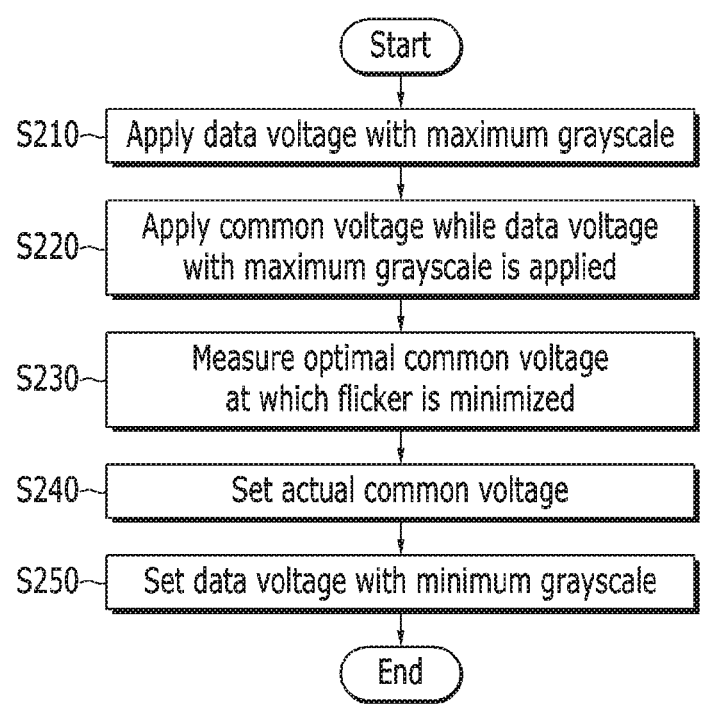
FIG. 15 is a flowchart illustrating a method of minimizing generation of an afterimage in the display device according to the exemplary embodiment of the present invention.

FIG. 15 is a flowchart illustrating a method of minimizing generation of the afterimage in the display device according to the exemplary embodiment of the present invention. FIG. 16 is a graph illustrating data voltages with a minimum grayscale and a maximum grayscale with respect to an optimal common voltage in the display device according to the exemplary embodiment of the present invention.

Figure 16:
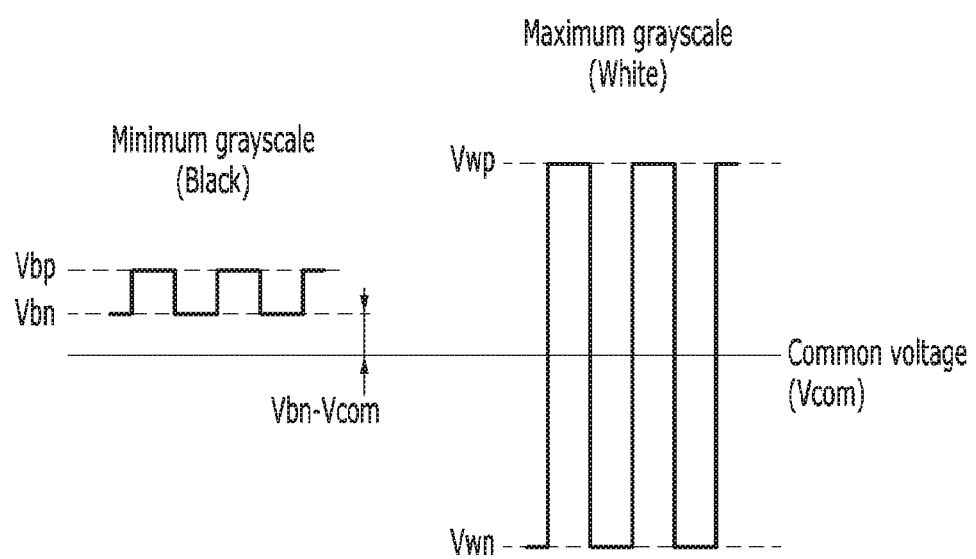
FIG. 16 is a graph illustrating data voltages of a minimum grayscale and a maximum grayscale with respect to the optimal common voltage in the display device according to the exemplary embodiment of the present invention.

Referring to FIGS. 15 and 16, the data voltage with the maximum grayscale may be applied to all of the plurality of pixels included in the display device (S210). The maximum grayscale means the highest grayscale which may be displayed on the display device. The maximum grayscale may be 64 grays, 256 grays, 1024 grays, and the like according to an exemplary embodiment, but is not limited thereto.

While the data voltage with the maximum grayscale may be applied, any common voltage may be applied to the common voltage of the display device (S220).

While any common voltage may be controlled, an optimal common voltage at which a flicker of the display device is the minimum is measured (S230). While the data voltage with the maximum grayscale may be applied to the plurality of pixels, the common voltage may be applied, and as a result, a white image may be displayed on the screen of the display device. If the common voltage does not coincide with an arithmetic mean value of a positive data voltage Vwp and a negative data voltage Vwn with a maximum grayscale, a difference between luminance when the positive data voltage Vwp may be applied and luminance when the negative data voltage Vwn may be applied occurs. Such a luminance difference causes the flicker in which the screen periodically flickers. If the common voltage coincides with the arithmetic mean value of the positive data voltage Vwp and the negative data voltage Vwn with the maximum grayscale, the difference between the luminance when the positive data voltage Vwp may be applied and the luminance when the negative data voltage Vwn may be applied is minimized and the flicker may also be minimized. When the flicker may be minimized, the common voltage is measured. The common voltage measured when the flicker is minimized becomes the optimal common voltage for the maximum grayscale. The common voltage may be measured at a point of a center of a display area including the plurality of pixels. Alternatively, the common voltage may also be measured at a plurality of points which is evenly distributed in the display device. When the common voltage is measured at the plurality of points which is evenly distributed in the display device, an average value of the common voltage measured at the plurality of points may be set to the optimal common voltage for the maximum grayscale.

The optimal common voltage for the maximum grayscale may be set to the actual common voltage Vcom applied to the common voltage of the display device (S240). For example, as exemplified in FIG. 10, when the optimal common voltage for the maximum grayscale (256 grays) may be measured to 6.24 V, the actual common voltage Vcom may be determined to 6.24 V.

When the optimal common voltage for the maximum grayscale may be determined as the actual common voltage Vcom, the afterimage due to the residual DC voltage is not generated at the maximum grayscale. That is, in the white pattern region, the ion impurities are not absorbed, and the afterimage level of the reverse afterimage is largely lowered.

After the actual common voltage Vcom may be determined, the data voltage with the minimum grayscale may be set (S250). The data voltage with the minimum grayscale is increased based on the set actual common voltage Vcom. In this case, while a difference between a positive data voltage Vbp with a minimum grayscale and a negative data voltage Vbn with a minimum grayscale is uniformly maintained, a positive data voltage Vbp with a minimum grayscale and a negative data voltage Vbn with a minimum grayscale may be increased. The negative data voltage Vbn with the minimum grayscale may be higher than the actual common voltage Vcom. Accordingly, the negative data voltage Vbn with the minimum grayscale may be set to be higher than the actual common voltage Vcom by a first voltage level (e.g., 1V) or more. The first voltage level is a reference voltage at which the ion impurities may be suppressed from moving in the black pattern region BP. In this case, while the side contrast ratio of the display device may be measured, the data voltage with the minimum grayscale may be increased, and the data voltage with the minimum grayscale may be maximally increased within a range where the side contrast ratio for the minimum grayscale is not changed. As a result, a difference between the negative data voltage Vbn with the minimum grayscale and the actual common voltage Vcom may be maximally set.

When a difference Vbn−Vcom between the negative data voltage Vbn with the minimum grayscale and the common voltage Vcom is small, as illustrated in FIG. 13, when the check pattern may be displayed, a movement amount of the ion impurity existing in the black pattern region BP toward the white pattern region WP is large.

On the other hand, when the difference Vbn−Vcom between the negative data voltage Vbn with the minimum grayscale and the common voltage Vcom may be maximally set within the range where the side contrast ratio is not changed, when the check pattern may be displayed, the movement amount of the ion impurity existing in the black pattern region BP is decreased. The reason is that the difference Vbn−Vcom between the negative data voltage Vbn with the minimum grayscale and the common voltage Vcom may be increased and thus the electric field of the black pattern region BP may be strengthened to suppress the ion impurities from moving. The movement of the ion impurities may be suppressed to minimize the linear afterimage which may be generated on the pattern boundary between the black pattern region BP and the white pattern region WP.

As a result, the optimal common voltage for the maximum grayscale may be determined as the actual common voltage Vcom, and the difference Vbn−Vcom between the negative data voltage Vbn with the minimum grayscale and the common voltage Vcom may be increased, thereby minimizing the reverse linear afterimage.

Table 1 is a result acquired by experimenting with an afterimage level according to the actual common voltage Vcom applied to the common voltage of the display device. As exemplified in FIG. 10, the optimal common voltage for the maximum grayscale (256 grays) is 6.24 V and the optimal common voltage for the halftone grayscale (128 grays) is 6.78 V.

TABLE 1

| Vcom | Reverse linear afterimage level |
|---|---|
| 6.78 V | 5 |
| 6.45 V | 1 |
| 6.24 V | 0 |

It can be seen that when the optimal common voltage of 6.24 V for the maximum grayscale may be set to the actual common voltage Vcom, the reverse linear afterimage level is 0, and when the optimal common voltage of 6.78 V for the halftone grayscale may be set as the actual common voltage Vcom, the reverse linear afterimage level is 5. Further, it can be seen that when the actual common voltage Vcom is set to 6.45 V, the reverse linear afterimage level is 1. Here, the reverse linear afterimage level is classified into 0 to 5, and 0 means a case where a reverse linear afterimage is not generated, 1 means a case where a reverse linear afterimage which is hardly recognized may be generated, and 5 means a case where a very clear reverse linear afterimage may be generated. Actually, when the reverse linear afterimage is in a range of 0 to 2, it can be seen that deterioration of display quality of the display device due to the reverse linear afterimage is not large.

Table 2 is a result acquired by experimenting with an afterimage level according to the negative data voltage Vbn with the minimum grayscale in the display device in which the optimal common voltage for the maximum grayscale is measured as 6.45 V.

TABLE 2

| Vcom | Vbn | Reverse linear afterimage level |
|---|---|---|
| 6.45 V | 8.02 V | 0 |
| | 7.78 V | 1 |
| | 7.68 V | 2 |

When the actual common voltage Vcom is determined to 6.45 V, it can be seen that in the case where the negative data voltage Vbn with the minimum grayscale is 8.02 V, the reverse linear afterimage level is 0, in the case where the negative data voltage Vbn with the minimum grayscale is 7.78 V, the reverse linear afterimage level is 1, and in the case where the negative data voltage Vbn with the minimum grayscale is 7.68 V, the reverse linear afterimage level is 2.

It can be seen that when the actual common voltage Vcom is 6.45 V, if the negative data voltage Vbn with the minimum grayscale is set to 7.68 V, the reverse linear afterimage level is 2, but if the negative data voltage Vbn with the minimum grayscale is set to 8.02 V, the reverse linear afterimage level may be improved to 0. That is, it can be seen that the difference Vbn−Vcom between the negative data voltage Vbn with the minimum grayscale and the common voltage Vcom may be increased to minimize the reverse linear afterimage.

The difference Vbn−Vcom between the negative data voltage Vbn with the minimum grayscale and the common voltage Vcom may be determined so as to suppress the ion impurities of the black pattern region from moving to the white pattern region, and may be determined according to a characteristic of the display device. Further, the difference Vbn−Vcom between the negative data voltage Vbn with the minimum grayscale and the common voltage Vcom may be maximally set within the range where the side contrast ratio is not changed, by considering the side visibility.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A display device, comprising:
   a liquid crystal panel assembly including a plurality of pixels;
   a data driver applying a data voltage to a plurality of data lines which is connected to the plurality of pixels; and
   a common voltage generator providing a common voltage to the liquid crystal panel assembly,
   wherein the data driver applies the data voltage with a minimum grayscale to the plurality of data lines so that a negative data voltage with the minimum grayscale is higher than the common voltage by a first voltage level or more.

2. The display device of claim 1, wherein:
   the common voltage is an optimal common voltage for a maximum grayscale at which a flicker is minimized while a data voltage with the maximum grayscale is applied to the plurality of pixels.

3. The display device of claim 1, wherein:
   the data driver increases the data voltage with the minimum grayscale while a difference between the positive data voltage and the negative data voltage with the minimum grayscale is uniformly maintained.

4. The display device of claim 3, wherein:
   the first voltage level is a reference voltage at which ion impurities are suppressed from moving in a black pattern region where the data voltage with the minimum grayscale is applied.

5. The display device of claim 3, wherein:
   the first voltage level is 1 V.

6. The display device of claim 3, wherein:
   the data driver increases the data voltage with the minimum grayscale so that the negative data voltage with the minimum grayscale is higher than the common voltage by a second voltage level; and
   the second voltage level is higher than the first voltage and is a maximum voltage at which a side contrast ratio for the minimum grayscale is not changed.

7. The display device of claim 3, wherein:
   the positive data voltage with the minimum grayscale is higher than the negative data voltage with the minimum grayscale; and
   the data driver maximally sets a difference between the negative data voltage with the minimum grayscale and the common voltage within a range where the side contrast ratio for the minimum grayscale is not changed.

8. The display device of claim 1, wherein:
   each of the plurality of pixels includes a first subpixel and a second subpixel, and when the data voltage is applied to the pixel, a pixel voltage of the first subpixel and a pixel voltage of the second subpixel are different from each other.

9. The display device of claim 8, wherein the first subpixel includes:
   a first switching element connected to the data line; and
   a first liquid crystal capacitor connected to the first switching element.

10. The display device of claim 9, wherein the second subpixel includes:
    a second switching element connected to the data line;
    a second liquid crystal capacitor connected to the second switching element; and a third switching element connected to the second liquid crystal capacitor and a divided reference voltage line.

* * * * *